(12) United States Patent
Fox et al.

(10) Patent No.: US 11,542,787 B2
(45) Date of Patent: Jan. 3, 2023

(54) METHOD OF CREATING AND EXECUTING A PLAN

(71) Applicant: Schlumberger Technology Corporation, Sugar Land, TX (US)

(72) Inventors: Maria Fox, Cambridge (GB); Derek Long, Cambridge (GB); Guillaume Jean Daniel Tamboise, Katy, TX (US); Rustam Isangulov, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/536,693

(22) PCT Filed: Dec. 21, 2015

(86) PCT No.: PCT/US2015/067134
§ 371 (c)(1),
(2) Date: Jun. 16, 2017

(87) PCT Pub. No.: WO2016/100973
PCT Pub. Date: Jun. 23, 2016

(65) Prior Publication Data
US 2017/0370191 A1    Dec. 28, 2017

Related U.S. Application Data (60) Provisional application No. 62/094,101, filed on Dec. 19, 2014.

(51) Int. Cl.
*E21B 41/00* (2006.01)
*E21B 44/00* (2006.01)
(Continued)

(52) U.S. Cl.
CPC .......... *E21B 41/0092* (2013.01); *E21B 19/14* (2013.01); *E21B 44/00* (2013.01); *G05B 15/02* (2013.01); *G06Q 50/00* (2013.01)

(58) Field of Classification Search
CPC ............................ E21B 41/0092; E21B 44/00
See application file for complete search history.

(56) References Cited

U.S. PATENT DOCUMENTS

| 6,424,919 B1 * | 7/2002 | Moran ..................... E21B 44/00 |
| | | 702/6 |
| 8,775,347 B2 | 7/2014 | Goel et al. |
| | | (Continued) |

OTHER PUBLICATIONS

Fox, Maria, and Derek Long. "PDDL2. 1: An extension to PDDL for expressing temporal planning domains." 2003. Journal of artificial intelligence research 20: 61-124. (Year: 2003).*

(Continued)

*Primary Examiner* — Brian M Epstein
*Assistant Examiner* — Sara Grace Brown
(74) *Attorney, Agent, or Firm* — Alec J. McGinn (57) ABSTRACT

A method includes accessing a domain model plan that includes a time independent initial state and a time independent goal state and sequences of events that include a sequence of a first event, a second event and a third event with conditional interrelationships; accessing operational data that include a failure condition for the third event and a time constraint for the failure condition; issuing a control instruction to rigsite equipment to perform a drilling-related action for generating the third event; during performance of the drilling-related action for generating the third event, receiving sensor data germane to the failure condition; upon occurrence of the failure condition, timing a duration of the occurrence of the failure condition; comparing the duration to the time constraint for the failure condition; and, based on the comparing, deciding to re-plan the domain model plan or to continue execution of the domain model plan.

11 Claims, 8 Drawing Sheets

(51) Int. Cl.
*E21B 19/14* (2006.01)
*G05B 15/02* (2006.01)
*G06Q 50/00* (2012.01)

(56) References Cited

U.S. PATENT DOCUMENTS

| | | | |
|---|---|---|---|
| 2002/0062156 | A1 | 5/2002 | Yamakawa et al. |
| 2004/0088115 | A1 | 5/2004 | Guggari et al. |
| 2005/0027495 | A1* | 2/2005 | Matichuk ............ G06F 9/45512 703/2 |
| 2005/0038631 | A1* | 2/2005 | Steinke ................. E21B 10/00 702/182 |
| 2005/0209836 | A1 | 9/2005 | Klumpen et al. |
| 2005/0209912 | A1 | 9/2005 | Veeningen et al. |
| 2008/0275594 | A1 | 11/2008 | de Guzman |
| 2008/0281525 | A1* | 11/2008 | Boone .................... E21B 44/00 702/9 |
| 2008/0306803 | A1 | 12/2008 | Vaal et al. |
| 2009/0132458 | A1* | 5/2009 | Edwards ................ G06N 5/025 706/50 |
| 2010/0332442 | A1* | 12/2010 | Goel ....................... G06N 7/02 706/46 |
| 2011/0155463 | A1* | 6/2011 | Khromov ................ E21B 47/02 175/45 |
| 2011/0172976 | A1* | 7/2011 | Budiman ................ E21B 47/04 703/2 |
| 2012/0054246 | A1* | 3/2012 | Fischer ................. G06F 16/319 707/793 |
| 2013/0025937 | A1* | 1/2013 | Pilgrim ................... E21B 19/00 175/24 |
| 2013/0032401 | A1* | 2/2013 | Edbury .................... E21B 7/06 175/24 |
| 2013/0231787 | A1* | 9/2013 | Chapman ................ E21B 44/00 700/282 |
| 2014/0128996 | A1* | 5/2014 | Sayyarrodsari .. G05B 19/41885 700/29 |
| 2014/0208253 | A1 | 7/2014 | Pettus et al. |
| 2014/0214469 | A1 | 7/2014 | Callow et al. |
| 2014/0246238 | A1* | 9/2014 | Abbassian .............. E21B 44/00 175/40 |
| 2014/0318866 | A1* | 10/2014 | Lewis .................. E21B 41/0092 175/40 |
| 2015/0014058 | A1* | 1/2015 | Wassell ................... E21B 44/00 175/48 |
| 2015/0090498 | A1* | 4/2015 | Hareland ................ E21B 43/26 175/48 |
| 2016/0076354 | A1* | 3/2016 | Lai ........................ E21B 47/007 702/9 |
| 2016/0273330 | A1* | 9/2016 | Dashevsky ............. E21B 10/08 |
| 2016/0290118 | A1* | 10/2016 | Xue ........................ E21B 47/12 |
| 2016/0321544 | A1* | 11/2016 | Hassanzadeh ......... G06N 5/022 |
| 2018/0012310 | A1 | 1/2018 | Fox et al. |

OTHER PUBLICATIONS

Quintero Barrios, Ezequiel, et al. "Control of autonomous mobile robots with automated planning." (2011). (Year: 2011).*

Little, Iain, and Sylvie Thiebaux. "Probabilistic planning vs. replanning." 2007. ICAPS workshop on IPC: past, present and future. (Year: 2007).*

Iocchi, Luca, Daniele Nardi, and Riccardo Rosati. "Strong cyclic planning with incomplete information and sensing." 2004. Proc. of 4th Int. Workshop on Planning and Scheduling for Space. (Year: 2004).*

Nunes, Vanessa Tavares. Dynamic process adaptation: Planning in a context-aware approach. August Diss. PhD Thesis in Computer Science and System Engineering. COPPE-Federal University of Rio de Janeiro, Rio de Janeiro, Brazil, 133p. (Year: 2014).*

International Search Report and Written Opinion issued in International patent application PCT/US2016/012254 dated Apr. 21, 2016. 17 pages.

Firby, R.J., Adaptive Execution in Dynamic Domains,Ph.D. Thesis, Yale University Department of Computer Science, 1989.

Simmons et al., "A task Description Language for Robot Control," Proceedings of the Conference on Intelligent Robotics and Systems, Vancouver, BC, Canada, Oct. 1998. 7 pages.

Gat, Erann, "ESL: A Language for Supporting Robust Plan Execution in Embedded Autonomous Agents", Proceedings of the AAAI Fall Symposium on Plan Execution, 1997. 6 pages.

Berry, G., The Esterel v5 Language Primer, version 5.21 release 2.0, Centre de Mathematiques Appliquees, Ecole des Mines and INRIA, Apr. 6, 1999.

Ingham et al., 2001: A Reactive Model-Based Programming Language for Robotic Space Explorers, Proceedings of ISAIRAS-01.

International Search Report and Written Opinion issued in International patent application PCT/US2015/067134 dated Apr. 1, 2016. 13 pages.

Office Action for the cross referenced U.S. Appl. No. 15/541,381 dated Apr. 24, 2019.

* cited by examiner

METHOD OF CREATING AND EXECUTING A PLAN

TECHNICAL FIELD

The present disclosure relates to a method of executing a plan in the upstream oil and gas industry. The present disclosure relates in particular to the automated planning and/or execution of tasks for a process in the upstream oil and gas industry. In particular, the disclosure relates to improved methods of creating and executing automation plans for equipment used in the upstream oil and gas industry, such as for drilling equipment, cementing or completion equipment during an oil well drilling process.

BACKGROUND TO THE DISCLOSURE

The process known as automated planning defines a framework to describe the physical world associated with a goal oriented activity. This is done through modelling a finite set of actions that can change the state of the world or environment in which an activity is being carried out. The state of the world and changes to the state of the world are detected and registered by a number of monitoring inputs to the system from sensors, for example.

Dynamic automated planning ("dynamic planning") generally comprises choosing and scheduling a number of actions that will change the state of the world, or an environment in which the activity is being carried out, from an initial state to a goal state. Each action carried out to achieve the goal has an effect on a predetermined number of state variables, and can only be executed if a given set of conditions based on another predetermined number of state variables are met.

When an action is executed, if the action does not have the expected effect on the world, the plan is said to fail. Then a new plan is built starting from the new current initial state, which is the state reached after execution of the failed action.

For example, in the drilling domain, the action of drilling to the next connection in a drill string can take as a precondition that the drilling bit is on the bottom of the bore drilled so far, and can have as an effect on the world that the hole depth has increased by the length of a stand, since the last connection. A stand is a sub-section of drill piping from which the drill string is generally constructed in sections. A stand is generally a drill pipe section of a certain set length, ranging from around 10 metres or 30 feet, to around 30 metres or 90 feet.

Applied to the upstream oil and gas drilling domain, a drill-a-stand plan would get the world from an initial state, in which the string is in slips with a new portion of a drill pipe (stand) being above the stick-up point at the beginning of stand number n, to a goal state, in which the string is in slips with the same stand being below the stick-up point at the end of the drilling of stand number n.

Known planning technologies can lack flexibility and generally work in a prescriptive manner, such that the plan instructs a controller of a drilling system to carry out numbered actions in a predetermined order and in a predetermined time scale. If the end of each action does not result in an expected state of the world, then the plan is deemed to have failed and re-planning is necessary. Re-planning can be a time consuming and exercise, with re-planning times ranging from a few seconds to minutes, depending upon the complexity of the overall operation. Re-planning time taken up on a large and valuable drilling rig delays the overall drilling operation and can reduce efficiency and increase overall costs.

Known planning technologies generally pre-define plans without allowing flexibility in the plan for variations in real time constraints or conditions which can affect the world in which the plan is executed, but which are not specifically identified in the plan. If an unexpected condition takes the plan outside of its initially defined envelope of operation then the plan is deemed to have failed and re-planning occurs. Further, known planning technologies execute actions based upon a time elapsed during the execution of the plan, or at specific time steps in the execution of the plan.

SUMMARY OF THE DISCLOSURE

The present disclosure seeks to overcome drawbacks of known planning techniques.

The disclosure provides a plan structure, and a method for executing a plan for a process in the upstream oil and gas industry. The plan defines logical, sequential and conditional interrelationships between events in the plan, so that a controller can carry out the plan in a flexible and time-independent manner to complete the sequenced events with minimal constraints. The definition of the logical, sequential and conditional interdependencies permits flexibility in how the controller uses time and resources available to it, so that the plan directs the controller in a non-prescriptive manner, allowing greater flexibility in plan execution and reducing the necessity for re-planning to occur when changes in the world or environment in which the controller executes the plan are detected.

In the present disclosure, an event is generally associated with one action, or optionally with more than one action. An event generally relates to one or more of: the start of an action or actions to which the event relates; or the end of an action or actions to which the event relates. The start of an action can be instigated by a determination that a preauthorising condition has been met. This can be termed an authorising event. The end of an action can be confirmed by detection of a confirming condition, which confirms that the action has ceased or ended. This can be termed a confirming event.

The method of the disclosure executes a plan using a continuous model of time, so that, in place of prior art methods, in which discrete actions are scheduled based upon discrete timings and discrete criteria, the execution of actions in the method of the disclosure is controlled based upon continuous assessment and monitoring of changes affecting the start or continued execution of actions initiated during the carrying out of the plan. Working from a model of the drilling domain, modelled in a modelling language such as PDDL+, a plan used in the method of the disclosure is constructed automatically by a hybrid planning system. The plan of the disclosure allows for flexibility in the use of time or resources used to execute the plan, by use of its definitions of interdependencies and interrelationships between actions making up the plan and defined preconditions and failure conditions which may apply.

The method of the disclosure have applications in the oil and gas industry. Planning works in a context of its "world model". The world model defines all available actions and rules, e.g. pre-conditions, effects etc., that are used to sequence together actions into a plan that achieves a specific goal. The method of the disclosure has particular properties that allow, after generation of a plan, to effectively execute it through a control system or through a person who controls equipment manually. In drilling domain, the world model revolves around activities that are relevant to propagating a borehole, i.e. drilling. Therefore, the resulting plan can be used to effectively execute drilling operations by a driller in particular. In other domains, such as mud management systems, rig maintenance, and wireline operations, world models and execution roles and systems are different, but the structure is the same. Similar approach can be taken in applications where world models are quite different to well construction processes, such as production, logistics, etc.

The upstream Oil and Gas industry solves a number of planning problems throughout its operations. These include but not limited to planning, scheduling and execution of high level activities for entire field development, a single well related activities, and particular aspects of oil and gas operations such as well construction, well logging, well completion, production and abandonment. This disclosure provides a structure to reason about Oil and Gas planning problems, and therefore be able to plan, schedule and execute required activities through either available automated systems or instructions provided to personnel via human-machine interfaces. The method in this invention allows production of a detailed plan by identifying conditions such as "authorized by", "confirmed by", "failed by" for all events in the plan, so that both human operators and machine controllers can follow the plan with little ambiguity, similar to following standard work instructions or standard operating procedures.

Oil and Gas processes that involve scheduling a set of goal oriented activities to move the system in question from initial state to goal state can be modelled as a planning problem and can therefore benefit from the method described in this disclosure.

For instance, wireline logging can be described as follows:
Initial state: current well is not logged;
Goal: acquire quality logging date throughout the borehole;
Actions: described in standard operating procedures for wireline personnel and equipment;

Logistics and asset management (both personnel and equipment) are large parts of Oil and Gas operations. Logistics problems in particular are well suited to be solved by automated planning methods when modelled as follows:
Initial state: current locations of assets, plan for set of locations where assets have to be at defined time in the future, constraints on movement and possible locations for each asset, etc.;
Goal: required assets to be at required locations according to the plan;
Actions: movement or assets using available means of transportation;

Similarly, asset management for a rig site can be described as a planning problem:
Initial state: available personnel of different competency, their resource definition, such as number of working days, constraints, such as no more than 10 consecutive working days within two weeks;
Goal: having at least two similar competency personnel at the rig site at any time;
Actions: described in HR standard operating procedures;

According to the disclosure there is provided a method of executing a plan for a process in the upstream oil and gas industry, in a controller, to change a system in the upstream oil and gas industry from a first state to a goal state; the plan defining a plurality of events to be carried out to change the state of the system from the first state to the goal state; the plan further defining, for one or more of the plurality of events:
a list of any events in the plan which must precede the event;
an action to which the event relates; and
at least one condition for the event, selected from:
at least one authorising precondition;
at least one confirming condition; and
at least one failure condition;
the method comprising executing at least one of the plurality of actions defined in the plan, based upon a determination that any defined predecessor events for one or more events have been completed, and further comprising at least one of:
starting at least one action of the plan, independently of time, based upon a determination that a preauthorising condition has been met;
continuing at least one action in the plan based upon a continuous monitoring of whether the failure condition has been met; and
confirming that at least one action in the plan is complete, by a determination of whether the confirming condition has been met.

The 'system in the upstream oil and gas industry' refers to an entire system that is relevant to a process in the upstream oil and gas industry, and not just a software for use in the process. For example, in case of logistical problems the 'system' includes people, trucks, equipment, roads etc. For drilling, it includes rig equipment, well, drill pipes, fluids etc.

The method allows an automated plan to be executed in a more robust manner, since variations in time taken to complete actions, and influences from factors not accounted for in the domain model, can be accommodated during execution without a need to initiate re-planning.

The method may further comprise starting a subsequent action based upon the confirmation that at least one action in the plan is complete.

At least one of the conditions may be defined in relation to a predetermined expected time window.

The time window may be defined in relation to a preceding event in the plan.

The failure condition may be defined in relation to the predetermined time window.

At least one of the conditions may be defined in relation to a state based parameter.

The action may be started in the event that the state based parameter reaches a predefined state.

The action may be stopped in the event that the state based parameter reaches a predefined state.

The action may be stopped in the event that the state based parameter indicates the absence of a predefined condition.

An execution of at least one action in the plan is governed by a hybrid state, the hybrid state defined by a first variable being within a predetermined range of values, and a second, state based, variable being detected as being in a predetermined state.

The action or actions may relate to a drilling operation and the first state may be a first drilling state and the goal state may be a second drilling state.

The goal state may relate to one or more stands in the drilling operation having been drilled.

The action or actions may be actions carried out in a well cementing process.

The action or actions may be actions carried out to operate equipment, deliver equipment to, or withdraw items from the well on a wireline.

The action or actions may be actions in a well completion process, including any of: casing insertion, cementing and/or well perforation.

At least one of the events in the plan may define a parameter, preferably a control parameter, for an action executed by the event.

The plan may further define a list of any successor events for at least one of the plurality of events in the plan.

The disclosure further provides a system in the upstream oil and gas industry for executing a plan for a process in the upstream oil and gas industry, comprising a controller, the controller being configured to carry out one or more method steps of the disclosure described herein.

The disclosure further provides a computer program, or a suite of computer programs, comprising instructions which, when carried out by a processor of a computing device, cause the computing device to be configured to carry out one or more method steps of the disclosure described herein. The disclosure further provides a computer readable medium, comprising the computer program, or at least one of the suite of computer programs.

The disclosure further provides a plan for use in the upstream oil and gas industry, the plan defining a plurality of events to be carried out to change the state of a system in the upstream oil and gas industry from a first state to a goal state; the plan further defining, for one or more of the plurality of events:
  a list of events in the plan which must precede the event;
  an action to which the event relates; and
  at least one condition for the event, selected from:
    at least one authorising precondition;
    at least one confirming condition; and
    at least one failure condition.

In some preferred embodiments, there is provided a method of construction of a subterranean or sub-sea well by executing a plan, in a controller, to change the well from a first construction state to a goal construction state;
  the plan defining a plurality of events to be carried out to change the state of the well from the first construction state to the goal construction state; the plan further defining, for one or more of the plurality of events:
    a list of any events in the plan which must precede the event;
    an action to which the event relates; and
    at least one condition for the event, selected from:
      at least one authorising precondition;
      at least one confirming condition; and
      at least one failure condition;
  the method comprising executing at least one of the plurality of actions defined in the plan, based upon a determination that any defined predecessor events for one or more events have been completed, and further comprising at least one of:
    starting at least one action of the plan, independently of time, based upon a determination that a preauthorising condition has been met;
    continuing at least one action in the plan based upon a continuous monitoring of whether the failure condition has been met; and
    confirming that at least one action in the plan is complete, by a determination of whether the confirming condition has been met.

A subterranean or sub-sea well is an example of a 'system in the upstream oil and gas industry', and can have states that change due to activities that are performed by automated systems or personnel.

Any or all of the above features of the disclosure can be combined in any combination to provide advantages which will become further apparent on reading the following detailed description.

BRIEF DESCRIPTION OF THE DRAWINGS

The disclosure will now be described, by way of example only, with reference to the accompanying drawings in which.

DETAILED DESCRIPTION OF THE DISCLOSURE

The planning system of the disclosure will now be described with reference to a specific example of a plan for drilling a stand during construction of an oil or gas well.

Figure 1:
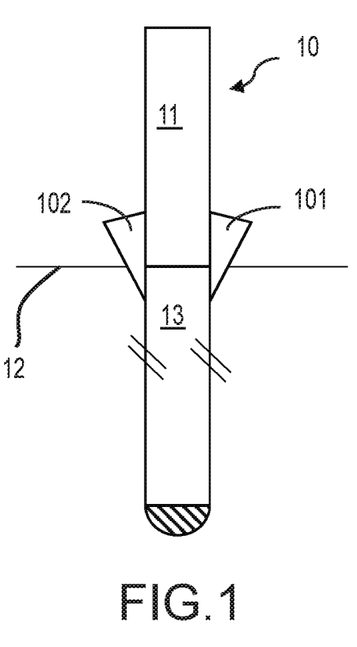
FIG. 1 shows a well construction system in a first construction state.

FIG. 1 shows a drilling system for carrying out the drilling step in a well construction process. However, the method of creating and executing a plan according to the disclosure can be applied to other aspects of well construction, such as cementing and completion operations and wireline operations, for example, by adaptation of the planning and execution methods described herein.

In FIG. 1 the drill string 10 is in slips 101 and 102 with a new portion of a drill pipe (stand) 11 being above the stick-up point 12, and a remainder of the string 13 being below the stick-up point 12.

Figure 2:
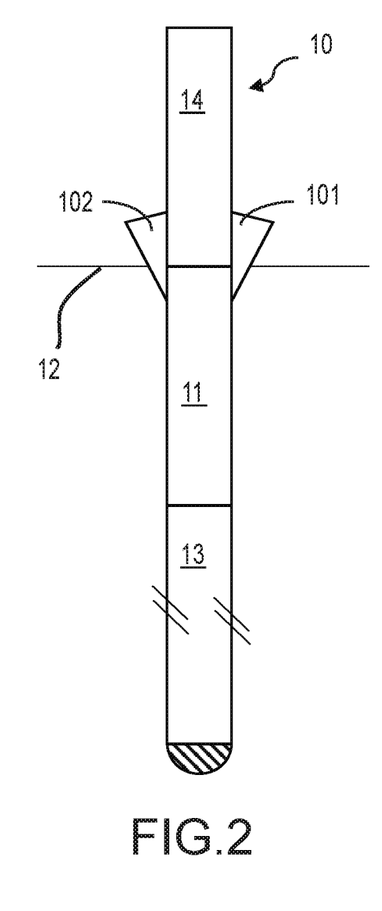
FIG. 2 shows a well construction system in a second, goal, construction state.

FIG. 2 shows the string 10 now in a new state, where a stand has been drilled, the portion of drill pipe 11 is now below the stick-up point 12 and the string is once again held in slips with a further new portion of drill pipe 14 above the stick-up point. As is known to the skilled reader, numerous stands can be added to the drill string and can be sequentially drilled into the ground as the drill bit at the bottom of the string penetrates the ground and pumping systems can be used to circulate mud to bring shale fragments and earth up from the drill head. A drill bit wears as it is used to drill into the ground and so will need to be replaced periodically. Models can be created based upon calculations and/or empirical data, defining a rate of drill bit wear for a given rate of penetration of the drill bit into certain types of ground. This allows a planner of a drilling operation to know approximately when a drill bit should need replacing and when it should be necessary to trip-out the drill string to replace the drill bit.

The example plan described herein relates to the steps of drilling a number of stands and scheduling appropriate trip-out operations at the necessary times. This takes the drilling rig from the construction state illustrated in FIG. 1 to the construction state illustrated in FIG. 2, and on further to drill further stands, stopping for trip-out operations as necessary.

In order to get the system from the construction state illustrated in FIG. 1, to the second construction state illustrated in FIG. 2, it is necessary for a controller to carry out a part of a plan. Plans can be developed manually by a user, or automatically by a computer based planner. In the present disclosure, plans are created by an automated planning system, to have the plan structure described and disclosed herein.

The automated planner develops a plan for execution by a controller, while the plan of the present disclosure builds greater independence and flexibility into the plan than prior planning systems. Prior automated planning systems generally create a list of tasks to be completed at particular times, possibly incorporating certain preconditions for a set action to be executed, but no flexibility in when an action can be started is defined in prior plans. This means that if a certain task is not completed by the defined time for the next task to take place, then the plan is deemed to have failed and re-planning is necessary. The plan according to the present disclosure defines, for events in the plan, a set of preceding events, a set of following, or successor, events and at least one condition to detect the event having occurred or to authorise an action to be begun. Time is not a determining factor in the plan of the disclosure and the plan is executed based upon event interdependencies and detected conditions without defining event start times, end times or durations in a prescriptive manner. As will become apparent from the following description, the plan executed in accordance with the method of the present disclosure is time independent and can therefore be executed based purely upon logical constraints and both planned and executed incorporating flexibility of time and resources available to carry out the actions in question.

Figure 3:
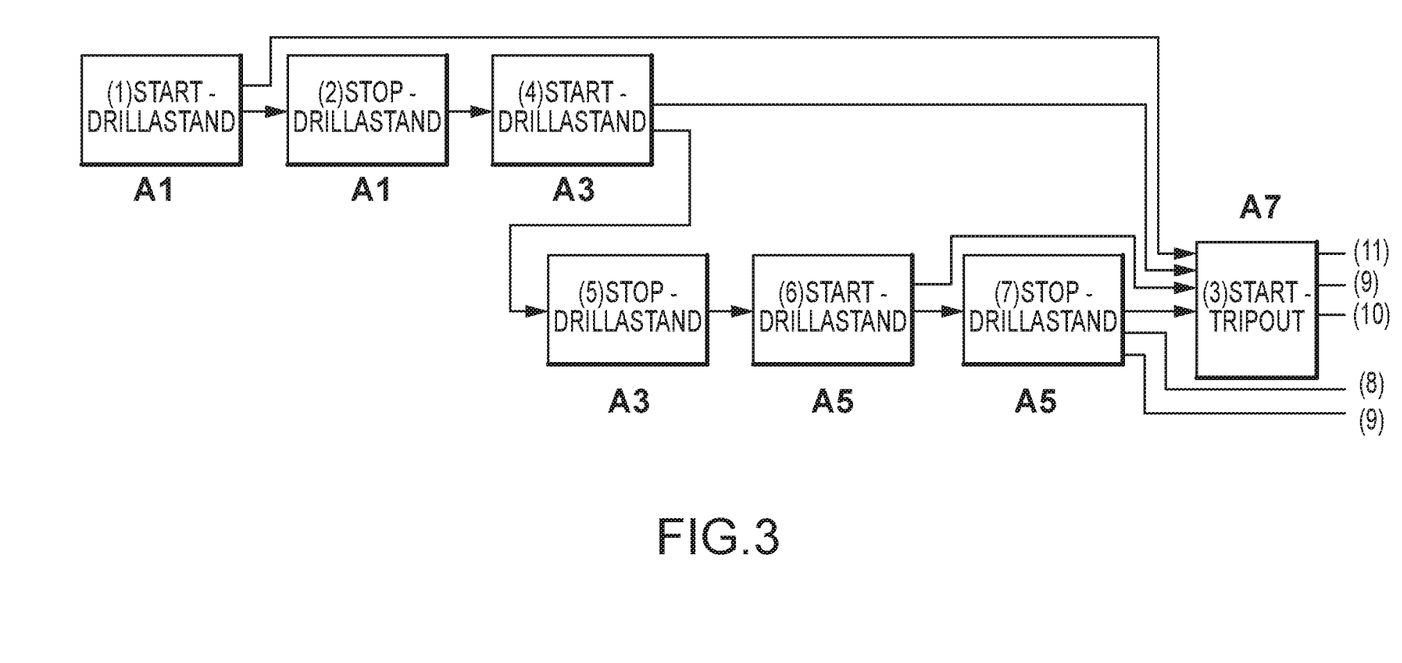
FIG. 3 shows a first portion of a graphical representation of a plan of the disclosure.

Turning to the simple plan of the illustrated example, beginning in FIG. 3, the plan starts with event #1, which is a drillastand event. It has successors 2 and 3, meaning that events numbered 2 and 3 (all event numbers are illustrated in the Figures in parentheses) and since it is the first event it has no predecessors. For the event #1 there is also identified an action number, in this case action #1, denoted on the figures as A1, and an action name, in this case DrillAStand. A parameter can also be set for the action and in this case, the parameter is set as ROP High, indicating that the controller should aim to achieve a high rate of penetration. Further, preconditions can be set for the execution of an event and, in this instance, the preconditions are, firstly, that the drill bit is securely on the bottom of the well, defined by the Authorising Precondition 'onbottom'. This can be detected, for example, by pressure sensors in the drill head, by sensing tension in pulleys supporting the drill string, or in other supporting structures of the drill string. A further precondition is that the system is not currently drilling, defined as 'notcurrentlydrilling', which can be detected by an output from the drill motor, torque sensors, or other suitable means.

These parameters for event #1 are summarised in Table 1 and further events will be described in a similar manner in relation to similarly formatted Tables, which are numbered according to the event number to which they relate, rather than being numbered consecutively, for ease of cross-referencing to the figures.

TABLE

| Event #1 | |
| --- | --- |
| Event # | 1 |
| Successors | 2, 3 |
| Predecessor | — |
| Action # | 1 |
| Action Name | DrillAStand |
| Parameter | ROP High |
| Authorising Precondition(s) | onbottom; notcurrentlydrilling |
| Failure condition(s) | failedcondition(onbottom) |

Event #1 therefore starts the drillastand process and so in response to Event #1 the controller begins a drillastand procedure. The example shown is simplified for ease of reference and conciseness, but in a practical implementation, further steps may be present in the plan. Examples of such further steps are instructions to the controller to start pumps for the mud in the drill string, and a check to verify that the drill string is released from slips before drilling, and any other checks or procedures necessary to permit drilling to begin. Where the order of events is not critical, the plan can define this in its structure. For example, the events in the plan defining how the action of checking the string is not in slips and starting the pumps may be given the same predecessors and successors as one another and may be given the same authorising preconditions. This allows the controller to simply ensure that the same preceding events have occurred before executing either or both of the events for checking the string is not in slips and starting the pumps. The plan therefore defines no order or execution for such 'parallel' events and the controller is free to execute them at any point in time and in any order to achieve the state necessary to start the drillastand operation.

An example of a failure condition may be defined by a parameter which must stay true for the action entailed by the event to validly continue. This can be defined as a failed condition—i.e. a condition which can directly indicate that the event has failed, and potentially that the overall plan has failed. As an example, Event #1 described in Table #1 above, can have a failed condition set as 'onbottom', since for the drillastand operation to validly continue it is imperative that the drill bit is detected as being on the bottom of the hole.

Event #2 in the plan has successor 4 and predecessor 1. The action number is 1 and a confirming condition is set as notcurrentlydrilling. This event therefore confirms that drill-a-stand has stopped, by detection that the system is not currently drilling. Its parameters can be summarised in the following Table 2.

TABLE 2

| | |
| --- | --- |
| Event # | 2 |
| Successors | 4 |
| Predecessors | 1 |
| Action # | 1 |
| Action Name | — |
| Parameter | — |
| Confirming Condition(s) | notcurrentlydrilling |
| Failure condition(s) | Exceededtime (mintime, maxtime, Event#1) |

A physical situation which can cause the controller to know that the drillastand operation is complete is that the drilling block mounted to the top of the stand being drilled will reach its bottom point, this can confirm that the stand has been fully drilled into the ground and so the plan allows for detection of this in Event #2. No time constraint is placed on event #2, but the conditions are that for it to occur, Event #1 must have occurred and notcurrentlydrilling is detected. A further check for validity of event #2 can be included in a second example of a failure condition. This can be a time based failure condition and can define a valid time window in which Event #2 can be detected to have occurred, in relation to Event #1. If the event has either occurred outside the expected time window (i.e. too early), or has not occurred by the end of the expected time window (i.e. is too late), then the action can be deemed to have failed. For example, knowing an expected rate of penetration (ROP), and a given length of the stand, an expected time for completion of the drillastand operation can be defined in the plan, as T(stand). However, it may be deemed acceptable by the planner that the time T(s) can be plus or minus a certain margin either side of the expected time T(s), so the actual time can validly be as low as a minimum time (mintime), defined as T(s) minus T(undertime). The actual time may also be as high as a maximum time (maxtime) defined as T(s) plus T(overtime). This can be defined as a specific type of failure condition and is expressed in relation to the event based upon which the time limits are set. A suitable syntax is shown in Table 2 above. The time restriction is therefore set as a range of acceptable times within which the event may validly occur in relation to one or more preceding events.

Event #4 is a further drillastand operation and has the predecessor 2 and successors 5 and 3. Its action number is set as 3, for future events to refer to, and the action name is drillastand. As for the event #1, event #4 sets the rate of penetration for the second stand to high, and starts on condition that the drill bit is on the bottom of the well and the system is not currently drilling. The failed condition onbottom applies as before for event #1. The parameters can be summarised as shown in Table 3 in the following:

TABLE 4

| | |
|---|---|
| Event # | 4 |
| Successors | 5, 3 |
| Predecessor | 2 |
| Action # | 3 |
| Action Name | DrillAStand |
| Parameter | ROP High |
| Authorising Precondition(s) | Onbottom; notcurrentlydrilling |
| Failure condition(s) | failedcondition(onbottom) |

Similarly for event #2, event #5 signals the end of the drillastand action of the second stand, begun in event #4, with the following parameters.

TABLE 5

| | |
|---|---|
| Event # | 5 |
| Successor | 6 |
| Predecessor | 4 |
| Action # | 3 |
| Action Name | drillastand |
| Parameter | — |
| Confirming Condition(s) | Notcurrentlydrilling |
| Failure condition(s) | Exceededtime (mintime, maxtime, Event#4) |

Event #6 starts a new drillastand action with a low rate of penetration. The choice of rates of penetration for each stand is determined at the planning stage. Drill bit wear is also approximately known from empirical data and previous usage. The planner can therefore be configured to incorporate into the plan a suitable selection of rates of penetration for the multiple stands which are drilled so that the bit wear does not reach zero mid-way through the drilling of a stand. This is advantageous, because the trip-out procedure, as described above, is a lengthy and expensive procedure, so it is preferable to have it occur at a point at the end of a drillastand action. Otherwise the trip-out action requires removal of the last stand and its reinsertion part way through a drilling action, which is inefficient. Therefore, the planner has set, in this example, the third stand to be drilled at a low rate of penetration (ROP) to preserve the drill bit to the end of the stand. Again, no time constraints need be set on when the stand starts, it is simply defined as occurring after the preceding events, as defined in Table 6.

TABLE 6

| | |
|---|---|
| Event # | 6 |
| Successors | 7, 3 |
| Predecessor | 5 |
| Action # | 5 |
| Action Name | DrillAStand |
| Parameter | ROP Low |
| Authorising Precondition(s) | On bottom; notcurrentlydrilling |
| Failure condition(s) | failedcondition(onbottom) |

Event #7, defined in table 7, monitors for the end of the drilling of the third stand in event #6, as was done for the preceding events #2 and #5.

TABLE 7

| | |
|---|---|
| Event # | 7 |
| Successors | 3, 8, 9 |
| Predecessor | 6 |
| Action # | 5 |
| Action Name | — |
| Parameter | — |
| Confirming Condition(s) | notcurrentlydrilling |
| Failure condition(s) | Exceededtime (mintime, maxtime, Event#6) |

A scheduled trip-out action is set to be executed once event #7 is complete, as defined in Table 3 below.

TABLE 3

| | |
|---|---|
| Event # | 3 |
| Successors | 10, 11, 9 |
| Predecessors | 1, 4, 6, 7 |
| Action # | 7 |
| Action Name | Tripout |
| Authorising Precondition | Onbottom |

Event #3 allows a trip-out of the drill string to be carried out after events 1, 4, 6 and 7 have been completed. This trip-out will be triggered by the drilling of the third stand being complete, as detected in Event #7.

Figure 4:
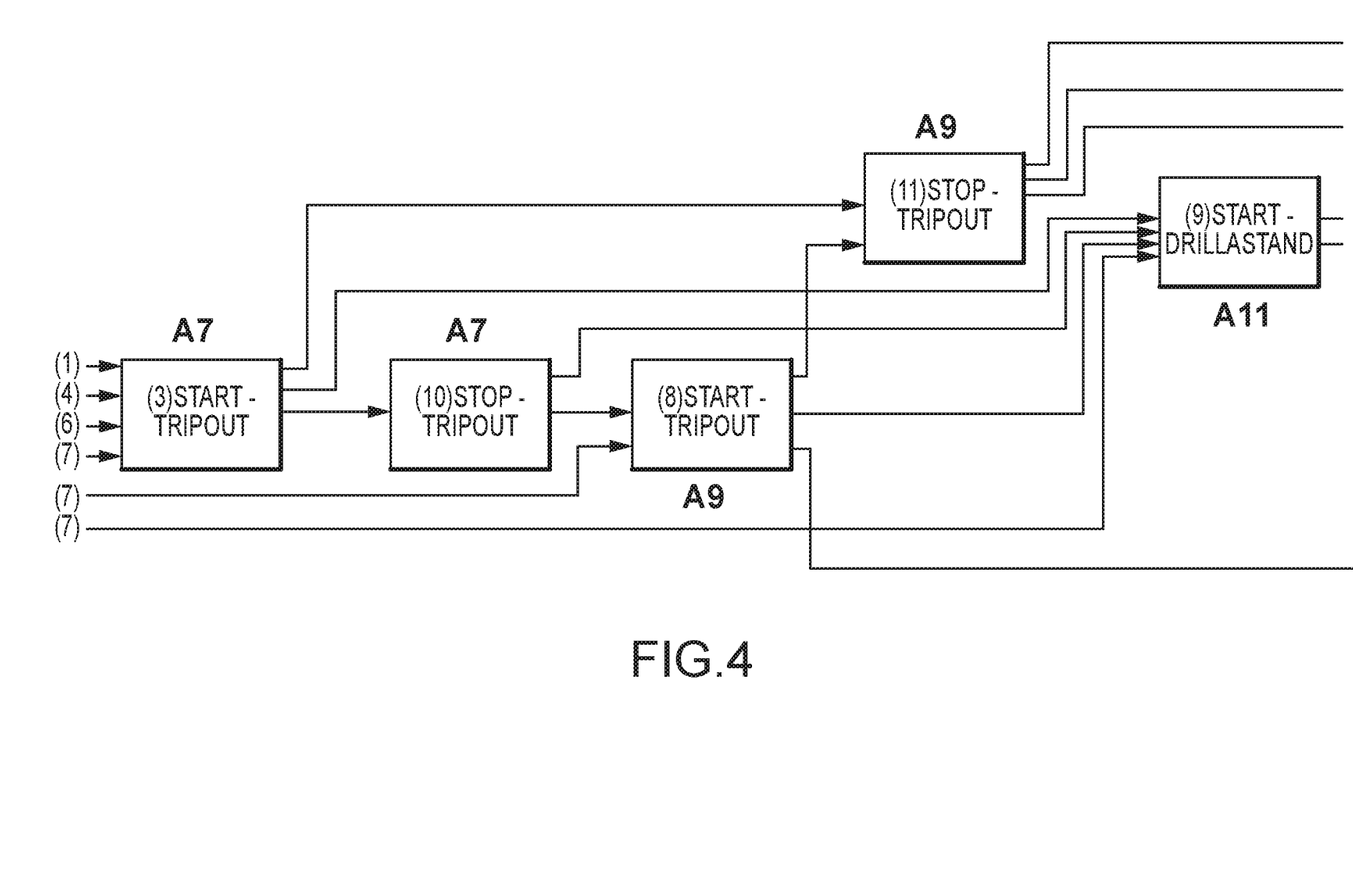
FIG. 4 shows a second portion of a graphical representation of a plan according to the disclosure.
Figure 5:
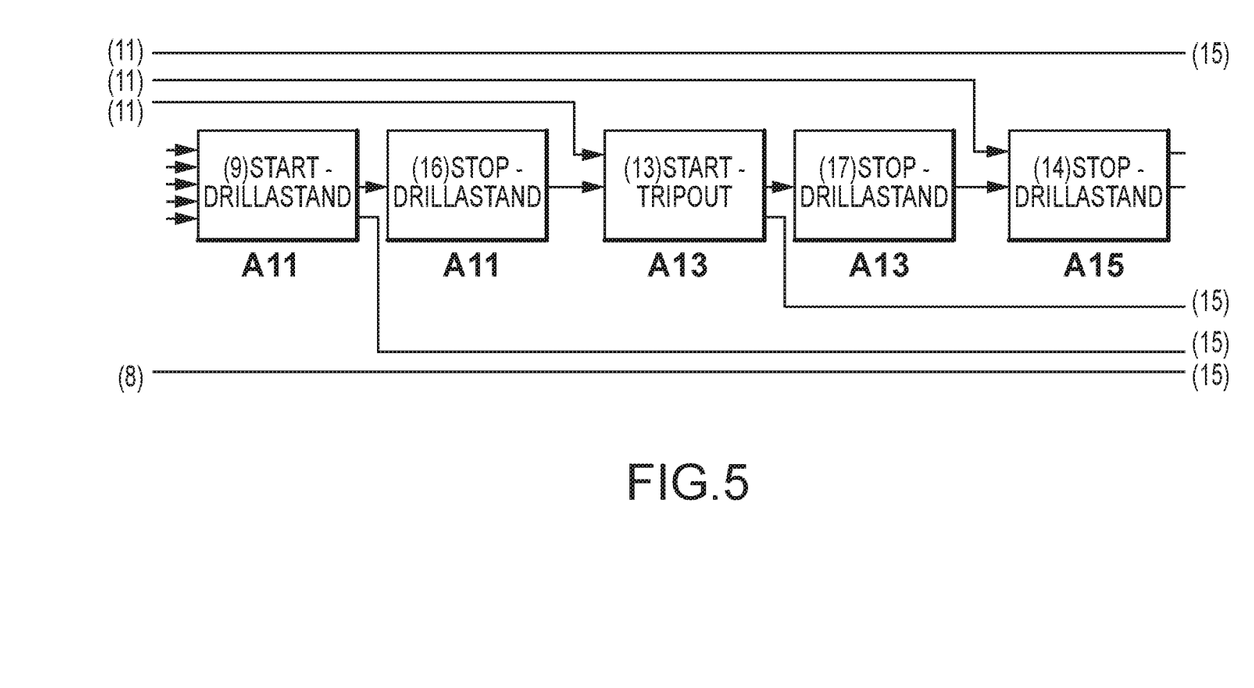
FIG. 5 shows a further portion of a graphical representation of a plan according to the disclosure.
Figure 6:
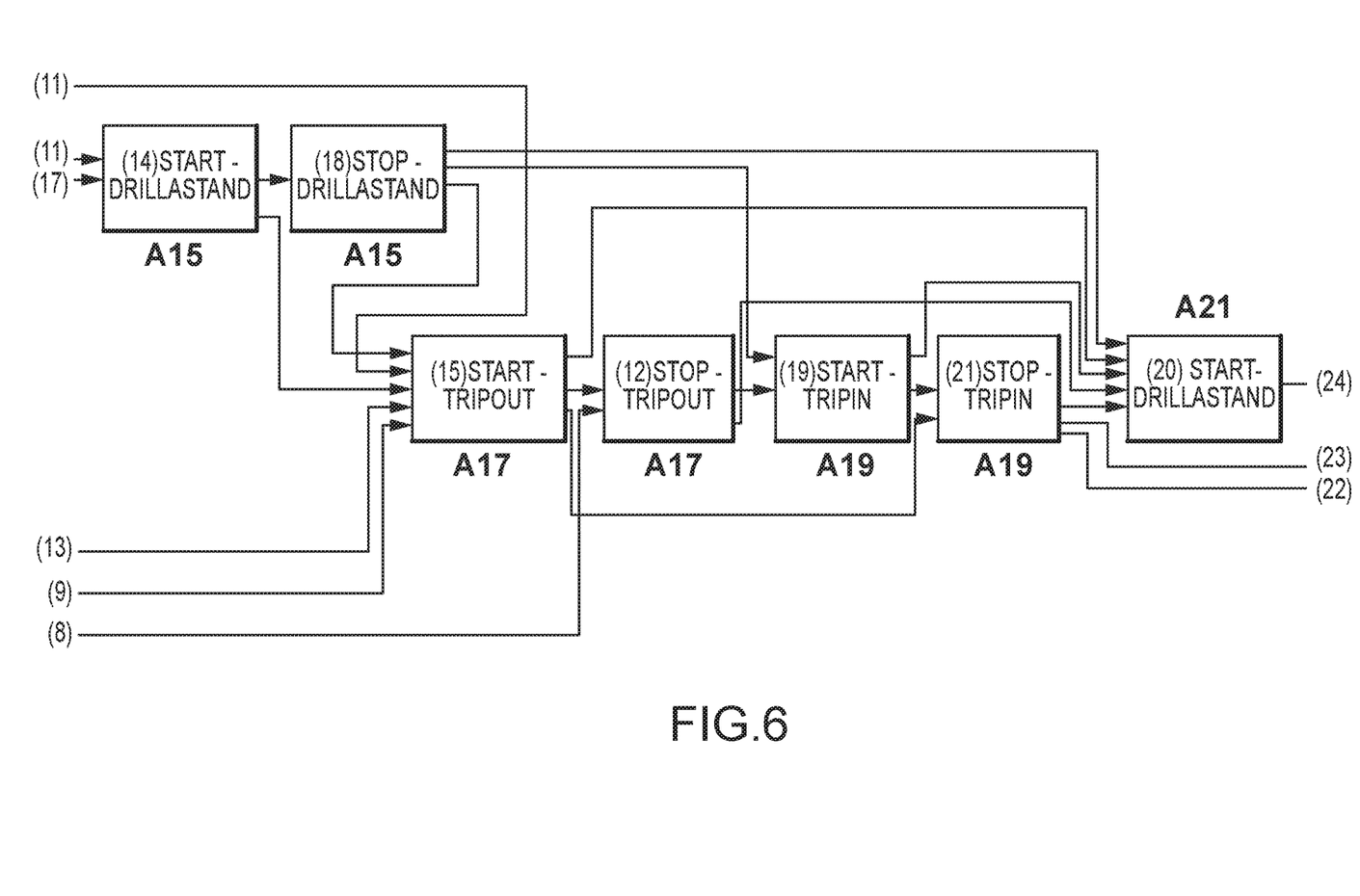
FIG. 6 shows a further portion of a graphical representation of a plan according to the disclosure.

FIG. 4 illustrates further events defined in the example plan. As can be seen so far, the actions are authorised by authorising conditions, while a state of the system or world in which the system exists is detected and confirmed by a confirming condition and these conditions can be continuously monitored to allow the system to detect failure of actions based upon monitored parameters as the 'failed conditions' described above. This allows the plan to be executed based upon detected conditions, without necessarily having to rely on absolute time information.

After event #3, FIG. 4 continues with the following events as set out in the following tables, numbered according to their event number:

TABLE 10

| | |
|---|---|
| Event # | 10 |
| Successors | 8, 9 |
| Predecessor | 3 |
| Action # | 7 |
| Action Name | tripout |
| Parameter | currentbitwear = 0 |
| Confirming Condition(s) | atsurface |

Event #10 stops the trip-out process and resets the current bit wear to zero when it has been detected that the drill bit is at the surface and has been changed, so that the bit wear on the drill bit can now be considered to be zero.

Event #8 then begins the trip-in process, as defined by the following conditions and precedents:

TABLE 8

| | |
|---|---|
| Event # | 8 |
| Successors | 11, 9, 12 |
| Predecessors | 7, 10 |
| Action # | 9 |
| Action Name | tripin |
| Parameter | — |
| Authorising Precondition | atsurface |

Event #11 stops the trip-in, which must happen after the trip-out has been started and then stopped, and once the trip-in started, and defines this with the following information in table 11.

TABLE 11

| | |
|---|---|
| Event # | 11 |
| Successors | 9, 13, 14, 15 |
| Predecessors | 3, 8 |
| Action # | 9 |
| Parameter | — |
| Confirming Condition(s) | onbottom |

The trip-in is therefore stopped when the confirming condition that the drill stand is on the bottom of the well is detected.

Event #9 then restarts the drilling process with a new drillastand action, as defined in the following in table 9

TABLE 9

| | |
|---|---|
| Event # | 9 |
| Successors | 16, 15 |
| Predecessors | 7, 3, 10, 8, 11 |
| Action # | 11 |
| Action Name | DrillAStand |
| Parameter | ROP High |
| Authorising Preconditions | Onbottom; notcurrentlydrilling |
| Failure condition(s) | failedcondition(onbottom) |

The end of drillastand action 11, begun in event #9, is detected in event #16 by detecting a state of not currently drilling as defined in the following table 16

TABLE 16

| | |
|---|---|
| Event # | 16 |
| Successor | 13 |
| Predecessor | 9 |
| Action # | 11 |
| Action Name | DrillAStand |
| Parameter | — |
| Confirming Condition(s) | Notcurrentlydrilling |
| Failure condition(s) | Exceededtime (mintime, maxtime, Event#11) |

Event #13 starts a further drill-a-stand operation once the drillastand operation of action 11 has completed, as detected in event 16, as defined in the following table 13.

TABLE 13

| | |
|---|---|
| Event # | 13 |
| Successors | 17, 15 |
| Predecessors | 11, 16 |
| Action # | 13 |
| Action Name | DrillAStand |
| Parameter | ROP High |
| Authorising Preconditions | Onbottom; notcurrentlydrilling |
| Failure condition(s) | failedcondition(onbottom) |

The end of drillastand action 13, begun in event 9 is detected at event #17 as defined in Table 17 below.

TABLE 17

| | |
|---|---|
| Event # | 17 |
| Successors | 14 |
| Predecessor | 13 |
| Action # | 13 |
| Parameter | — |
| Confirming Condition(s) | Notcurrentlydrilling |
| Failure condition(s) | Exceededtime (mintime, maxtime, Event#11) |

As for the earlier set of drillstand actions, event #14 begins a new drill-a-stand action at a lower rate of penetration, using the following parameters, to preserve drill bit life until the next scheduled trip-out as in Table 14 below.

| | |
|---|---|
| Event # | 14 |
| Successors | 18, 15 |
| Predecessors | 11, 17 |
| Action # | 15 |
| Action Name | DrillAStand |
| Parameter | ROP Low |
| Authorising Preconditions | Onbottom; notcurrentlydrilling |
| Failure condition(s) | failedcondition(onbottom) |

Event #18 detects the end of the end of the drill-a-stand action begun in event #14 by the following conditions defined in table 18 below.

TABLE 18

| | |
|---|---|
| Event # | 18 |
| Successors | 15, 19, 20 |
| Predecessor | 14 |
| Action # | 15 |
| Parameter | — |
| Confirming Condition(s) | notcurrentlydrilling |
| Failure condition(s) | Exceededtime (mintime, maxtime, Event#14) |

A further trip-out operation is then started at event #15, with conditions defined as in the following table 15.

TABLE 15

| | |
|---|---|
| Event # | 15 |
| Successors | 12, 21, 10 |
| Predecessors | 11, 9, 13, 14, 18 |
| Action # | 17 |
| Action Name | Tripout |
| Parameter | — |
| Authorising Precondition(s) | Onbottom |

TABLE 15-continued

The trip-out process is stopped, as previously in event #12, and the current bit wear is reset to zero once it is detected that the drill stand is at the surface, as for the previous trip-out in the following:

| Event # | 12 |
| --- | --- |
| Successors | 19, 20 |
| Predecessors | 18, 15 |
| Action # | 17 |
| Parameter | Currentbitwear = 0 |
| Confirming Condition(s) | atsurface |

Therefore, the trip-out operation is stopped when it is confirmed that the drill bit has reached the surface. The current bit wear is reset to zero, since a new drill bit will have been applied with zero wear at the surface. Automated checks of the drill bit replacement can also be incorporated into the plan or into the controller.

Next, in event #19, the trip-in operation is started, followed by the stopping of the trip-in operation at event #21 and a new drillastand operation is started at event #20. This is defined in the same way as for the preceding equivalent actions in the following tables.

TABLE 19

| Event # | 19 |
| --- | --- |
| Successors | 21, 20 |
| Predecessors | 18, 12 |
| Action # | 19 |
| Action Name | tripin |
| Authorising Precondition(s) | atsurface |

Detecting End of Trip-in by Confirmation of Onbottom Condition:

TABLE 21

| Event # | 21 |
| --- | --- |
| Successors | 20, 22, 23 |
| Predecessors | 15, 19 |
| Action # | 19 |
| Action Name | tripin |
| Confirming Condition(s) | Onbottom |

As before, once it is detected that the drill bit is on the bottom of the well and it is detected that drilling is not currently underway, then the drillastand action is started in event #20 as set out in Table 20 below.

TABLE 20

| Event # | 20 |
| --- | --- |
| Successor | 24 |
| Predecessors | 18, 15, 12, 19, 21 |
| Action # | 21 |
| Action Name | DrillAStand |
| Parameter | ROP High |
| Authorising Precondition(s) | onbottom; notcurrentlydrilling |
| Failure condition(s) | failedcondition(onbottom) |

Figure 7:
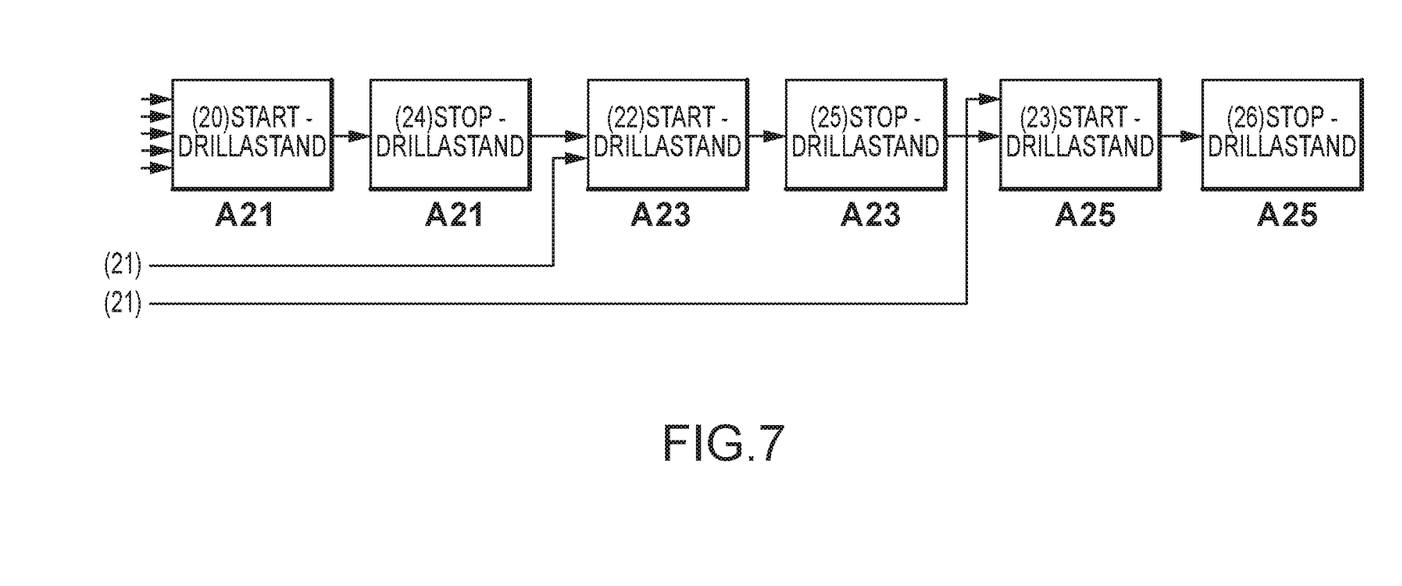
FIG. 7 shows a final portion of a graphical representation of a plan according to the disclosure.

In subsequent steps, event #24 detects a stopping of drill-a-stand action 21. Then, a further drill-a-stand action 23 can be started in event #22, with the end of that being detected at event #25. Event #23 can then restart a low rate of penetration drillastand action, to reach the end of the operation, which is detected by event 26 at the end of FIG. 7, as is defined in the following tables.

TABLE 24

| Event # | 24 |
| --- | --- |
| Successor | 22 |
| Predecessor | 20 |
| Action # | 21 |
| Action Name | DrillAStand |
| Parameter | — |
| Confirming Condition(s) | Notcurrentlydrilling |
| Failure condition(s) | Exceededtime (mintime, maxtime, Event#20) |

In event #22 a high penetration rate drilling operation is therefore begun.

TABLE 22

| Event # | 22 |
| --- | --- |
| Successor | 25 |
| Predecessors | 21, 24 |
| Action # | 23 |
| Action Name | DrillAStand |
| Parameter | ROP High |
| Authorising Precondition(s) | onbottom; notcurrentlydrilling |
| Failure condition(s) | failedcondition(onbottom) |

Event 25 detects the end of the high rate of penetration drill-a-stand operation of action 23, begun in event #22.

TABLE 25

| Event # | 25 |
| --- | --- |
| Successor | 23 |
| Predecessor | 22 |
| Action # | 23 |
| Action Name | DrillAStand |
| Parameter | — |
| Confirming Condition(s) | notcurrentlydrilling |
| Failure condition(s) | Exceededtime (mintime, maxtime, Event#22) |

A low rate of penetration drill-a-stand event is then begun to finish the stand in event #23 as follows:

TABLE 23

| Event # | 23 |
| --- | --- |
| Successor | 26 |
| Predecessors | 21, 25 |
| Action # | 25 |
| Action Name | DrillAStand |
| Parameter | ROP Low |
| Authorising Precondition(s) | onbottom; notcurrentlydrilling |
| Failure condition(s) | failedcondition(onbottom) |

Finally, the end of the drillastand action number 25 is detected in event 26 and the plan can be deemed to have been completed.

TABLE 26

| Event # | 26 |
| --- | --- |
| Successor | — |
| Predecessor | 23 |
| Action # | 25 |
| Action Name | DrillAStand |
| Authorising Precondition(s) | Notcurrentlydrilling |

As can be seen from the preceding description, the execution of the various actions is governed only by logical connections between the events scheduled in the plan and by preconditions which are detected or not detected, either at the beginning of, or during, the execution of certain actions.

The controller executing the plan defined herein therefore reads the entirety of the plan and can execute it based upon the logical connections and preconditions set out in steps in the plan which are governed by events.

During the planning stages, the balance of a number of expected trip-out operations versus an ideal rate of penetration can be set. Here additional external solvers may be employed to define when during the process a trip-out operation is best scheduled. Constantly drilling at a higher rate of penetration will result in more trip-outs, since the rate of wear will be higher. Complete extraction of the drill string to carry out the trip-out operation to replace the drill bit is a costly and time consuming exercise and so it is generally desirable to minimise these operations. This is why the planner may consult external solvers, which can inform the planner of the best rate of penetration to choose for different parts of the drilling operation to ensure an optimum rate of penetration, with a minimal number of trip-outs and drill bit changes.

As described above, the plan structure and methods of execution defined herein can be utilised in other areas of well construction and maintenance. The actions may also relate to the well completion process, and could be sequenced events for inserting chosen casings, any part of the well cementing process, activating perforating means such as bullet or jet perforators and other related actions. The actions may relate specifically to parts of the cementing process and can include actions such as casing insertion and packing, pumping of the cement, top and bottom wiper plug insertion, wiper plug release and related pumping. The actions may further relate to wireline operation and so can relate to the insertion or retraction of tooling or maintenance apparatus from the well by wireline.

Figure 8:
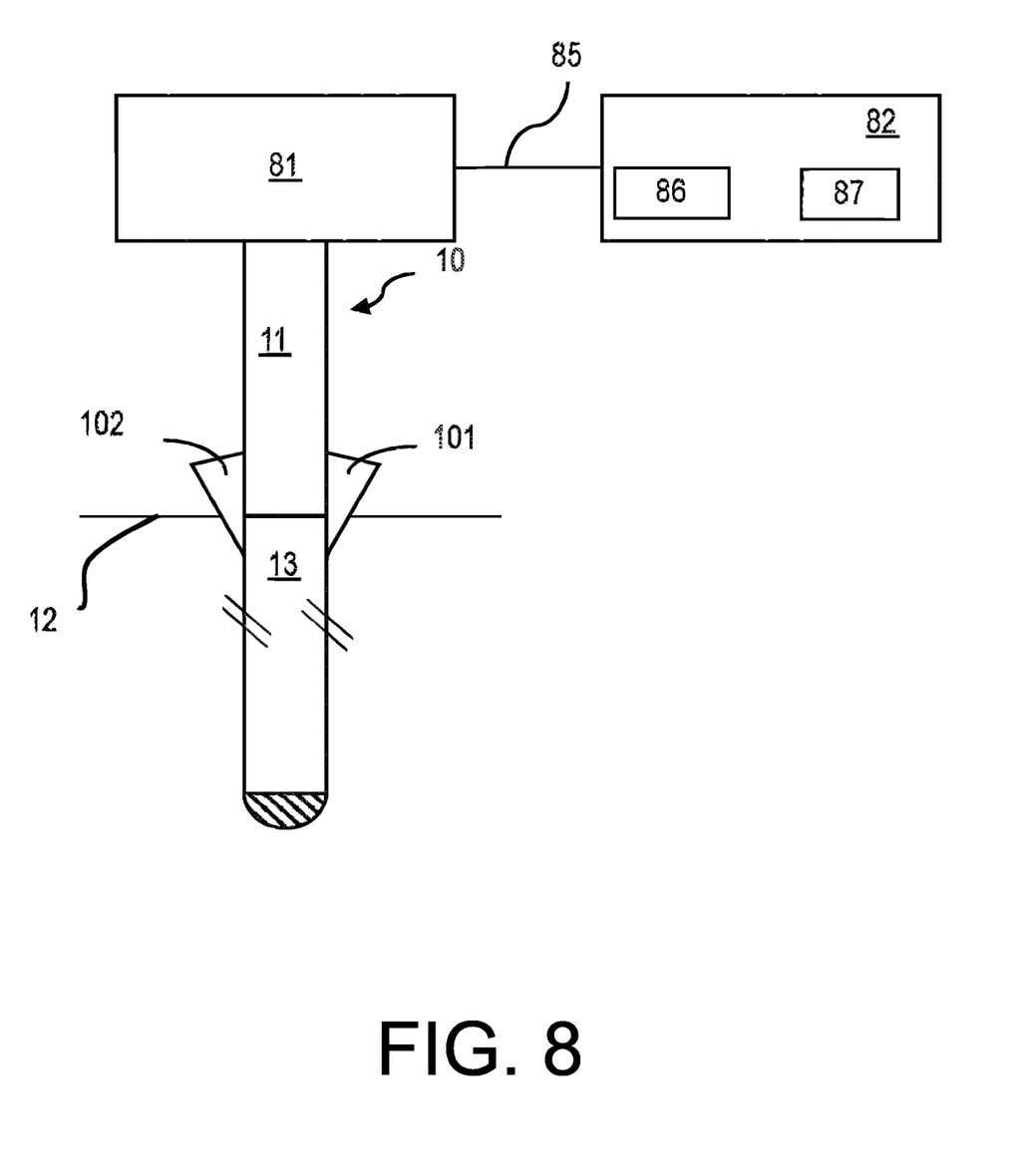
FIG. 8 shows an apparatus for carrying out the method of the disclosure.

FIG. 8 shows an apparatus for carrying out the methods of the disclosure. In addition to the same-numbered features described in relation to FIG. 1, the system comprises a drilling block 81, which can be equipped with a motor to drive the drill string, sensors to detect the drilling action, pumps and other components as used in well-known drilling block assemblies. The block is attached to a controller 82 by a controller connection 85, which may be a wired or wireless data connection. Controller 82 is equipped with controller means which are configured to execute the steps in the methods described herein, by carrying out the steps defined in the plan described in the above sections. A storage medium 87 may be equipped with the plan and the storage medium 87 may be read to a processing device 86, which may execute the plan as described above.

Figure 9:
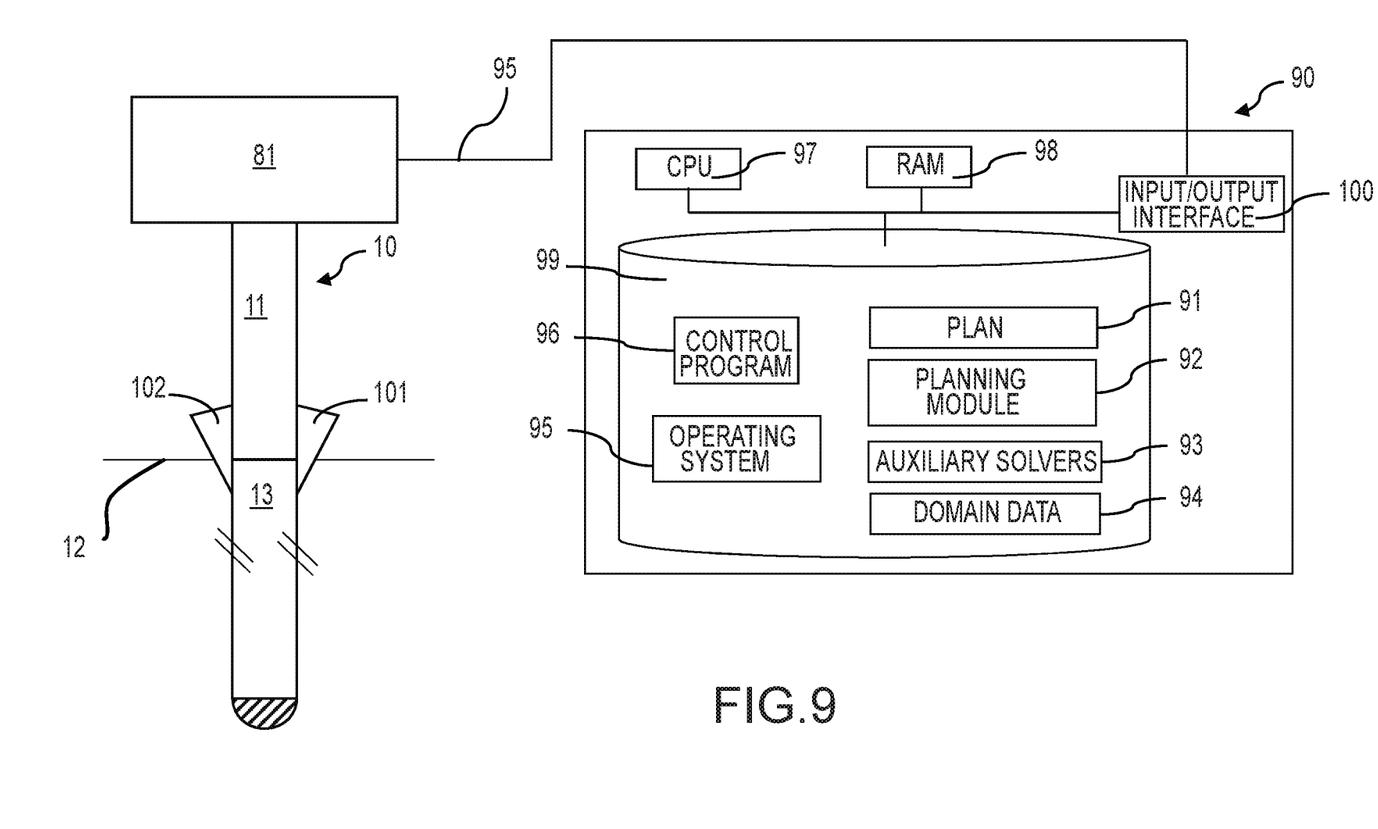
FIG. 9 shows further apparatus for carrying out the method of the disclosure.

FIG. 9 shows a computing device 90 which can also be used to implement an apparatus for carrying out the methods of the present disclosure. The computing device 90 is connected to the well construction equipment 10 via a data link 95, which may be a wired, fibre, other physical data link or a wireless data link. The data link is connected via and input/output interface 100 of the device 90. The computing device 90 has a Central Processor Unit (CPU) 97, live memory or Random Access Memory (RAM) 98 and a computer readable medium such as a solid-state disk harddisk or flash memory device 99 or the like. Stored on the memory 99 are a series of programs and data sets configured for executing the methods of the present disclosure. An operating system 95 carries general operating instruction for the computing device. A control program 96 carries instructions which, when read by the processor 97 cause the processor to be configured to read a plan 91 stored in the device 90 to carry out the methods described herein. A planning module 92 may also be included, to allow the device 90 to create plans for the controller module to execute as necessary. Auxiliary solvers may be included, to carry out certain auxiliary processing functions, such as the determination of bit wear vs. rate of penetration discussed in the present disclosure, during the planning procedure. Domain data may be stored, which can be fed to the planner and/or the controller in order to allow the plan to be developed and executed with an awareness of the parameters associated with the construction domain in question. The described system therefore provides a computer program 96 comprising instructions which, when executed by the processor 97, cause the processor to be configured to carry out any of the methods described herein.

A plan of the preferred embodiment can in practice be coupled with an operational file. The operational file can contain operational data about each of the available actions in the domain for which the planning is being carried out, such as the well construction domain of the examples described above. Information contained in a domain file is not repeated in the operational file. The domain file is set out in a PDDL (Planning Domain Definition Language)-based language and contains definitions of the environment in which the operation is taking place, in a manner known to those skilled in the art of planning domain definition. This PDDL-based model of the domain contains a deterministic model of the behaviour of system in the domain, under an assumption of complete knowledge of the initial state of the system and domain prior to plan execution. This deterministic definition means that, for known initial states and known inputs, repeatable output states are always achieved, with no randomness involved, so outcomes are therefore predictable.

Many of the execution conditions that affect success or failure of the execution of an action are external to the PDDL planning domain model. For example, in well construction, the Bottom Hole Assembly (BHA) might be considered stuck if the drill string has not rotated for several seconds, but the necessary sensing actions are not captured in the domain description because it only describes deterministic behaviour, without uncertainty. The planner uses an abstract model of how the plan will interact with the world, and execution failures can be expected unless the gap between the PDDL model and the sensed world is bridged. The operational file can help achieve this as follows.

The preferred embodiment includes the definition of the structure of the "operational file". The operational file supplements the domain definition file with information that is required during execution. This includes, for example, whether durative actions end with controllable or uncontrollable events (as are described in more detail in the following) and a description of failure conditions or events that are not described in the PDDL model. This allows the plan to cater for non-determinism in a way in which the PDDL model itself does not. The operational file bridges the gap between the domain model and the real world situation in place during execution by specifying control parameters. The control parameters include monitoring conditions, such as timeouts, and any other monitoring conditions that are not modelled in the domain file. The domain designer specifies the operational file alongside the domain file and a problem file specifying the problem, prior to creation of a plan. The operational file therefore contains operational data about each of the actions executed in the domain. It does not repeat information in the domain file, but instead provides additional information, in particular information relating to the authorisation, confirmation and timeout conditions.

The operational file in the preferred embodiment is given as an input to a planner and the information in the operational file is merged with the plan when the plan is generated, instantiated according to the final structure of the plan. This means that the final plan created for execution comprises operational data input from the operational file, which can increase the execution robustness of the plan and can allow the plan to cater for changes in the system state, experienced during execution of the plan, which are not catered for in the deterministic PDDL model of the domain.

For example, in the example of well construction, and a drilling operation in particular, the domain file can contain values or definitions representing the significance of soil conditions, rock formations and other geographical or seismic factors, which would influence the planning operation and which are generally repeatable and predictable. Specific instantiations of a rock formation property, however, are included in the specific problem definition for a particular planning exercise.

Properties and conditions specific to particular actions can be defined in the operational file. In the preferred embodiment, each action defined in the operational file has a name, a start and an end. The properties of the start of an action and the end of an action may be either identical or symmetrical, because the end of an action contains a confirming condition as defined above and the detection of the confirming condition, which would end the action, is not necessarily within the control of the planner. On the contrary, the planner is always able to control the start of an action in a plan.

The action start may have a timeout defined in the operational file, specifying the minimum time that must elapse after all the authorising preconditions have been met. This could be a zero value, and defines the amount of time which must have elapsed after those authorising preconditions are detected as having been met before the start of an action can be executed by the controller. There can also be defined a maximum time by which the start must have occurred. If the maximum timeout has been exceeded then the start of that action can be deemed to have failed.

The start of an action can also be deemed to have failed by the detection of conditions, i.e. failure conditions, which are not defined in the domain model, but which are defined in the operational file. These failure conditions would deem the action to have failed at the time of its execution. A failure condition, as described above, is given an attribute of an exceeded time, describing the minimum amount of time for which the failure condition should be observed before the plan is deemed to have failed, and also a maximum time that can have elapsed before the failed condition must be deemed to fail the action, and therefore potentially to fail the plan as a whole.

For example, the failed condition (e.g. onbottom) defined above can also be associated with an exceeded time failure condition, in combination, so that it defines a minimum amount of time during which the failed condition (e.g. onbottom) must be observed (i.e. a lack of the drill bit being on the bottom) before the plan fails. This allows for a brief instance of the drill bit not being on the bottom, without failing the whole plan if it is corrected quickly. The maximum time can also be defined to set a maximum amount of time which can pass before the detection of the failure condition (e.g. onbottom) must be addressed and no longer ignored. Action ends can be controllable, by defining the end of an action as being triggered in response to a command sent from the controller. For example a drilling action can be defined such that an end of the drilling action is triggered by a command from the controller to stop the drilling block from moving. This is an example of a controllable action end. Alternatively, action ends can be uncontrollable and these uncontrollable ends are simply confirmed by detection of a confirming condition, such as notcurrentlydrilling, as defined in the example plan above. An example is where a drilling command implemented in the controller sets the block to move by a set distance. In this instance, the end of the action is defined by the system detecting that the block has moved by the distance set. The end of the action is therefore not controlled by the controller, but is set to automatically occur on detection of the set distance being reached. From the perspective of the controller, the action end is automatically instigated by the system, based upon the way in which the event was defined. The end of an action can also have a continuous effect and in this case the end of the action is not controllable by the planner. The continuous effect in the example of a plan described herein could be one of "depth reached", which is the effect of a 'thillastand' action reaching the necessary depth. Observation of this attribute confirms the end of the drilling action. If the end of an action is controllable, such as in the case of the trip-out action, it may be authorised by any specific preconditions which have been defined, such as detection of the drill bit being at the surface.

Although the disclosure has been described above with reference to one or more preferred embodiments, it will be appreciated that various changes or modifications may be made without departing from the scope of the disclosure, as defined in the appended claims. It will also be apparent that features of these different embodiments can be combined both with one another and also with features of the prior art arrangements described herein in order to achieve the advantages of the disclosure.

The invention claimed is:
1. A method comprising:
generating an operational file that comprises operational data for sequential durative actions, wherein the operational data comprise conditions that comprise sensor-based authorization conditions, sensor-based confirmation conditions and sensor-based timeout conditions;
executing a hybrid planner using a deterministic model in a Planning Domain Definition Language (PDDL) to generate a plan for rigsite operations for an oil and/or gas well performed using rigsite equipment that integrates the operational data of the operational file to make the plan non-deterministic, wherein the deterministic model specifies deterministic behavior, without uncertainty, for actions that comprise the sequential durative actions and a final action, wherein each of the sequential durative actions is associated with a corresponding event having an expected detectable physical effect as a requisite, subject to one or more of the conditions of the operational file, for progressing to a subsequent one of the sequential durative actions or the final action;
executing the plan utilizing a controller and a continuous model of time that controls execution of the plan according the conditions of the operational file;
acquiring sensor data during the executing of the plan;
during the executing of the plan, for one of the sequential durative actions, increasing flexibility of the plan by reducing demand for re-planning by implementing at least one of the conditions of the operational file until the sensor data indicate occurrence of the expected detectable physical effect for the one of the sequential durative actions;

responsive to the indication of the expected detectable physical effect and independent of time, continuing the executing of the plan for another one of the sequential durative actions;

responsive to the executing of the plan for the another one of the sequential durative actions, determining that one of the conditions of the operational file is not met according to the sensor data; and responsive to the determining that one of the conditions of the operational file is not met, determining a physical state using at least the sensor data and issuing an instruction for executing the hybrid planner to generate a revised plan using the physical state as an initial physical state of the revised plan.

2. The method of claim 1, wherein the rigsite operations comprise drilling.

3. The method of claim 2, wherein the deterministic model specifies rates of penetration for multiple stands that are to be drilled such that remaining drill bit life does not reach zero mid-way through drilling of one of the multiple stands.

4. The method of claim 1, comprising providing the operational file as an input to the hybrid planner.

5. The method of claim 1, wherein the conditions of the operational file are not present in the deterministic model.

6. A system comprising:
a processor; and
a memory storing a program having instructions for causing the processor to:
generate an operational file that comprises operational data for sequential durative actions, wherein the operational data comprise conditions that comprise sensor-based authorization conditions, sensor-based confirmation conditions and sensor-based timeout conditions;
execute a hybrid planner using a deterministic model in a Planning Domain Definition Language (PDDL) to generate a plan for rigsite operations for an oil and/or gas well performed using rigsite equipment that integrates the operational data of the operational file to make the plan non-deterministic, wherein the deterministic model specifies deterministic behavior, without uncertainty, for actions that comprise the sequential durative actions and a final action, wherein each of the sequential durative actions is associated with a corresponding event having an expected detectable physical effect as a requisite, subject to one or more of the conditions of the operational file, for progressing to a subsequent one of the sequential durative actions or the final action;
execute the plan utilizing a controller and a continuous model of time that controls execution of the plan according the conditions of the operational file;
acquire sensor data during the executing of the plan;
during execution of the plan, for one of the sequential durative actions, increase flexibility of the plan by reduction in demand for re-planning by implementation of at least one of the conditions of the operational file until the sensor data indicate occurrence of the expected detectable physical effect for the one of the sequential durative actions;
responsive to the indication of the expected detectable physical effect and independent of time, continue the execution of the plan for another one of the sequential durative actions;
responsive to the execution of the plan for the another one of the sequential durative actions, determine that one of the conditions of the operational file is not met according to the sensor data; and
responsive to a determination that one of the conditions of the operational file is not met, determine a physical state using at least the sensor data and issue an instruction for execution of the hybrid planner to generate a revised plan using the physical state as an initial physical state of the revised plan.

7. The system of claim 6, wherein the rigsite operations comprise drilling.

8. The system of claim 7, wherein the deterministic model specifies rates of penetration for multiple stands that are to be drilled such that remaining drill bit life does not reach zero mid-way through drilling of one of the multiple stands.

9. The system of claim 6, wherein the operational file is an input to the hybrid planner.

10. The system of claim 6, wherein the conditions of the operational file are not present in the deterministic model.

11. A non-transitory computer readable medium storing a program having instructions for causing a processor to:
generate an operational file that comprises operational data for sequential durative actions, wherein the operational data comprise conditions that comprise sensor-based authorization conditions, sensor-based confirmation conditions and sensor-based timeout conditions;
execute a hybrid planner using a deterministic model in a Planning Domain Definition Language (PDDL) to generate a plan for rigsite operations for an oil and/or gas well performed using rigsite equipment that integrates the operational data of the operational file to make the plan non-deterministic, wherein the deterministic model specifies deterministic behavior, without uncertainty, for actions that comprise the sequential durative actions and a final action, wherein each of the sequential durative actions is associated with a corresponding event having an expected detectable physical effect as a requisite, subject to one or more of the conditions of the operational file, for progressing to a subsequent one of the sequential durative actions or the final action;
execute the plan utilizing a controller and a continuous model of time that controls execution of the plan according the conditions of the operational file;
acquire sensor data during the executing of the plan;
during execution of the plan, for one of the sequential durative actions, increase flexibility of the plan by reduction in demand for re-planning by implementation of at least one of the conditions of the operational file until the sensor data indicate occurrence of the expected detectable physical effect for the one of the sequential durative actions;
responsive to the indication of the expected detectable physical effect and independent of time, continue the execution of the plan for another one of the sequential durative actions;
responsive to the execution of the plan for the another one of the sequential durative actions, determine that one of the conditions of the operational file is not met according to the sensor data; and
responsive to a determination that one of the conditions of the operational file is not met, determine a physical state using at least the sensor data and issue an instruction for execution of the hybrid planner to generate a revised plan using the physical state as an initial physical state of the revised plan.

* * * * *